US008539599B2

(12) United States Patent
Gomez et al.

(10) Patent No.: US 8,539,599 B2
(45) Date of Patent: Sep. 17, 2013

(54) PASSWORD PROTECTION USING PERSONAL INFORMATION

(75) Inventors: Laurent Gomez, Le Cannet (FR); Slim Trabelsi, Nice (FR); Aymen Mouelhi, Sophia Antipolis (FR)

(73) Assignee: SAP AG, Walldorf (DE)

( * ) Notice: Subject to any disclaimer, the term of this patent is extended or adjusted under 35 U.S.C. 154(b) by 143 days.

(21) Appl. No.: 12/980,006

(22) Filed: Dec. 28, 2010

(65) Prior Publication Data

US 2012/0167225 A1 Jun. 28, 2012

(51) Int. Cl.
*H04L 29/06* (2006.01)

(52) U.S. Cl.
USPC .............. 726/26; 726/27; 726/28; 726/29; 726/30; 713/182; 713/183; 713/184; 713/185

(58) Field of Classification Search
USPC ............................................. 726/26
See application file for complete search history.

(56) References Cited

U.S. PATENT DOCUMENTS

| | | | | |
|---|---|---|---|---|
| 2005/0114678 | A1* | 5/2005 | Bagga et al. | 713/183 |
| 2008/0052245 | A1* | 2/2008 | Love | 705/76 |
| 2010/0031365 | A1* | 2/2010 | Krishnamurthy et al. | 726/26 |
| 2010/0286841 | A1 | 11/2010 | Subbloie | |

FOREIGN PATENT DOCUMENTS

| | | |
|---|---|---|
| AU | 2010202088 A1 | 12/2010 |
| WO | 2005004020 A1 | 1/2005 |

OTHER PUBLICATIONS

Extended EP Search Report for EP Application No. 11009930.6, mailed May 24, 2012, 7 pages.
International Search Report for PCT/IB2003/04364, mailed Apr. 7, 2004, 2 pages.
Extended EP Search Report for EP Application No. 11010045.0, mailed May 30, 2012, 5 pages.
"Become a Sustainability Leader with SAP Carbon Impact", Use an On-Demand Solution for Effective Carbon Management, SAP Solution in Detail, 2009, 12 pages.
"Kyoto Protocol to the United Nations Framework Convention on Climate Change", United Nations, 1998, 21 pages.
"An Introduction to Smart Energy", Jennic, White Paper, JN-WP-7002, Revision 1.2, Dec. 3, 2009, 26 pages.
"Communication From the Commission to the European Parliament, the Council, the European Economic and Social Committee and the Committee of the Regions", 20 20 by 2020 Europe's Climate Change Opportunity, Commission of the European Communities, Brussels, COM(2008) 30 final, Jan. 23, 2008, 12 pages.
Sullivan, "Excelling At Enterprise Carbon Management and Sustainability", An Executive Business Framework for Sustainability 2.0, SAP White Paper, 2009, 18 pages.
Kolappan, et al, "Energy Star Version 5.0 System Implementation", Intel, White Paper, Document No. 321556-001, Feb. 2009, 91 pages.
"Bringing the Smart Grid Into the Home: The Value of Home Energy Management for Utilities", Cisco, White Paper, Jun. 2010, 6 pages.
Ameling, et al, "Demand-Side Energy Management for Manufacturing", 2010, 10 pages.

* cited by examiner

*Primary Examiner* — Longbit Chai
(74) *Attorney, Agent, or Firm* — Brake Hughes Bellermann LLP (57) ABSTRACT

Provided personal information from a user may be determined, the provided personal information being associated with network publication thereof. A comparison of the provided personal information with password-related information may be performed. Based on the comparison, it may be determined that a risk level associated with the network publication relative to password security of at least one password associated with the password-related information exceeds a predetermined risk level. The user may be notified that the network publication of the provided personal information is associated with potential compromise of the password security of the at least one password.

17 Claims, 9 Drawing Sheets

Change your Password

Type your current password:

Type a New Password:

702

Type the new password again to confirm:

Type a word of phase to use as a password hint:

The password hint will be visible to everyone who uses this computer.

704

Password hint too close to personal information!!!

FIG. 7

PASSWORD PROTECTION USING PERSONAL INFORMATION

TECHNICAL FIELD

This description relates to the use of computer passwords.

BACKGROUND

Passwords are commonly used to provide users with secure access to computing and/or network resources. For example, a password may be set with respect to a computer, so that a user of the computer may thereafter be required to enter the password in order to access or modify files, settings, or other resources associated with the computer. In other examples, a user may wish to access network resources using the network, and may be required to enter a previously-designated password in order to do so.

Because the use of passwords in these in similar context is so widespread, it may occur that a given user is associated with a relatively large number of passwords. Consequently, various techniques may be employed to assist users in remembering or otherwise managing their passwords. For example, users often choose to select passwords which have particular significance to them, so as to thereby assist themselves in remembering their passwords. Additionally, various techniques are used to assist users in case the users forget a particular password. For example, it is common to associate a particular password with one or more pieces of information which may separately authenticate a user, so that, based on such independent authentication, the user may be provided with the forgotten password in a secure manner. Somewhat similarly, it is common to associate a given password with information which is intended to provide a hint to the user, to thereby assist the user in remembering the forgotten password.

However, these and similar measures which are used in assisting users in remembering or otherwise managing their various passwords often may provide a point of vulnerability with respect to the passwords. Such vulnerability may be exploited by unauthorized users who wish to gain access to the ostensibly password protected resources.

For example, such an unauthorized user may utilize network resources to perform a search for information personally related to a given authorized user. Such personal information may be published regarding the user by a third party, or may be published by the authorized user (e.g., using a social networking website). In any case, the unauthorized user may be able to search for and locate such published personal information, using commonly available network searching techniques. Once the unauthorized user is in possession of such personal information, the unauthorized user may attempt to utilize the personal information to obtain one or more passwords associated with the authorized user. As a result, a security of the authorized user with respect to one or more computing resources may be compromised or breached.

SUMMARY

According to one general aspect, a system may include instructions recorded on a computer-readable storage medium and executable by at least one processor of at least one computing device. The system may include a content inspector configured to cause the at least one processor to detect provided personal information from a user, the provided personal information being associated with network publication thereof. The system may include a password inspector configured to cause the at least one processor to detect password related information. The system may include a comparator configured to cause the at least one processor to perform a comparison of the provided personal information with the password-related information, and to determine, based on the comparison, that a risk level associated with the network publication relative to password security of at least one password associated with the password-related information exceeds a predetermined risk level, and further configured to notify the user that the network publication of the provided personal information is associated with potential compromise of the password security of the at least one password.

According to another general aspect, provided personal information from a user may be determined, the provided personal information being associated with network publication thereof. A comparison of the provided personal information with password-related information may be performed. Based on the comparison, it may be determined that a risk level associated with the network publication relative to password security of at least one password associated with the password-related information exceeds a predetermined risk level. The user may be notified that the network publication of the provided personal information is associated with potential compromise of the password security of the at least one password.

According to another general aspect, a computer program product tangibly embodied on a computer-readable medium may include instructions that, when executed, are configured to detect provided personal information from a user, the provided personal information being associated with network publication thereof, perform a comparison of the provided personal information with password-related information, determine, based on the comparison, that a risk level associated with the network publication relative to password security of at least one password associated with the password-related information exceeds a predetermined risk level, and notify the user that the network publication of the provided personal information is associated with potential compromise of the password security of the at least one password.

The details of one or more implementations are set forth in the accompanying drawings and the description below. Other features will be apparent from the description and drawings, and from the claims.

DETAILED DESCRIPTION

Figure 1:
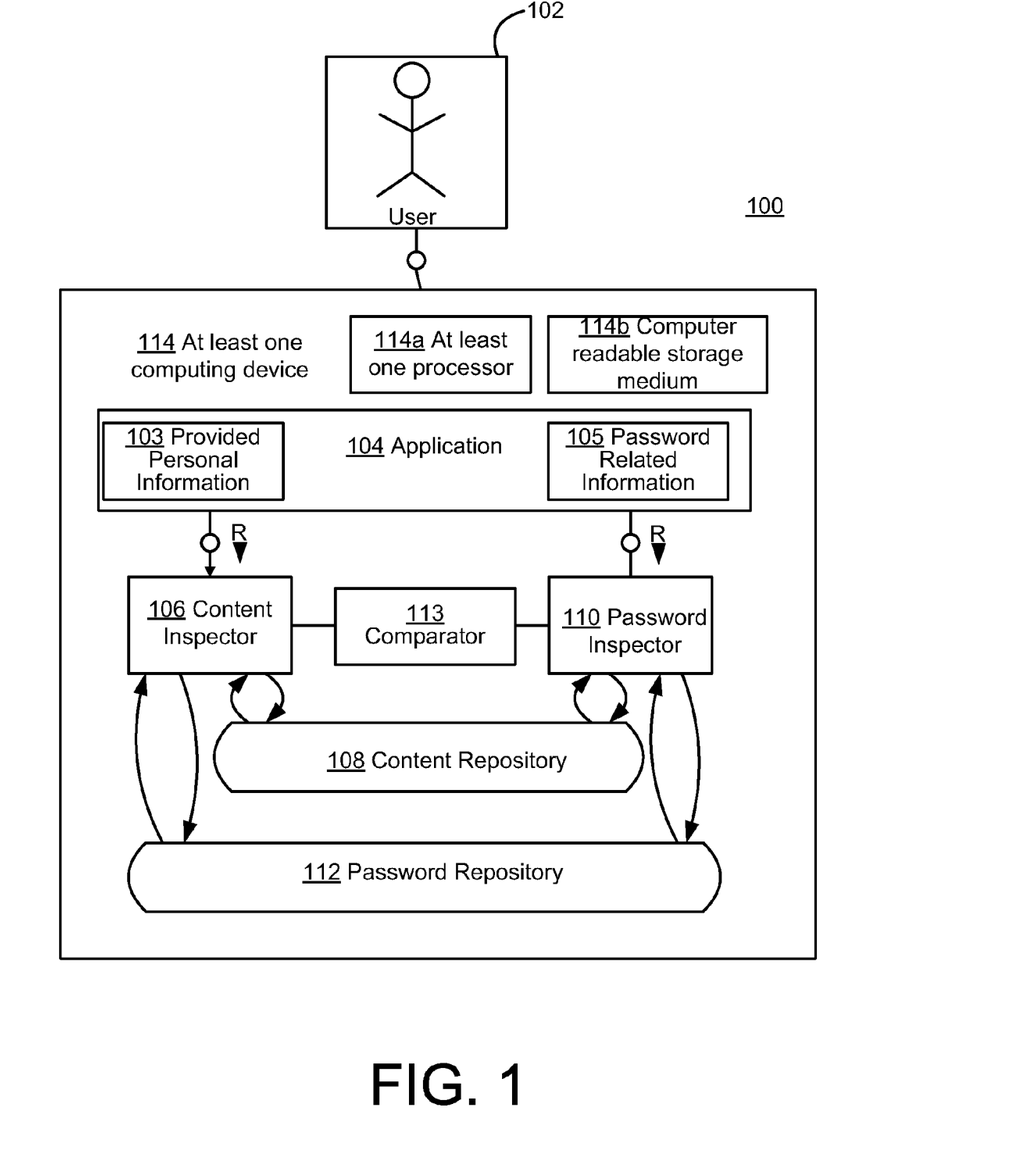
FIG. 1 is a block diagram of a system for providing enhanced password based security.

FIG. 1 is a block diagram of a system 100 for providing enhanced security for password based security techniques. As described in detail below, the system 100 may be configured to reduce or eliminate vulnerabilities associated with the use of one or more common password management techniques. Specifically, as referenced above, such common password management techniques often rely on the use of personal information during the creation, maintenance, or recovery of passwords. Consequently, as described in detail herein, the system 100 of FIG. 1 may be configured to minimize, regulate, prevent, or otherwise manage the improper or undesired publication, or potential publication, or other use of such personal information in password-related contexts. In this way, unauthorized users may be less likely or less able to exploit such personal information when attempting to gain unauthorized access to a password protected computing resource.

In the example of FIG. 1, a user 102 is illustrated as utilizing an application 104. In this context, it may be appreciated that the user 102 may represent virtually any human or computer user which may make use of password-related security techniques. Similarly, the application 104 should be broadly understood to represent virtually any software which may implement or otherwise benefit from the use of password related security techniques.

To provide a few illustrative, non-limiting examples, it may occur that the application 104 executes locally to the user 102, and represents a computer operating system or any individual application running thereon. In other examples, the application 104 may represent a software application which directly or indirectly accesses one or more available computer networks. For example, such networks may include the public internet, a private network (e.g., a corporate intranet), or a personal network (e.g., a home wireless network) of the user 102. In a particular example, the application 104 may represent a browser application which is used to access the internet. Again, however, it will be appreciated that a nature and use of various applications represented by the application 104 are well known, and too numerous to mention or describe in any detail.

Similarly, examples of the user 102 would be well understood by one of skill in the art, and are also not described here in detail, except as may be necessary or helpful in understanding example operations of the system 100 of FIG. 1. For example, the user 102 may represent a unique individual, a group of individuals sharing a common characteristic (e.g., a particular role within an organization, or a particular security clearance), or may represent a computing resource (a software based service or agent which may conduct inter-application communications with the application 104). Various other examples of the user 102 and/or the application 104 are described herein, or would be apparent.

Further, although the simplified example of FIG. 1 illustrates a single user using a single application, it may be appreciated that, in fact, multiple users may interact with one or more applications during various operations of the system 100 of FIG. 1. For example, multiple members of a family may access one or more applications running within the context of a personal wireless network. In other examples, users across the world may access internet based resources, such as, e.g., social networking websites, internet based email accounts, and virtually any other internet based publication or resource. In still other examples, various users within a particular corporate environment may have access to one or more applications (and associated computer or network resources) represented by the application 104.

Thus, it may be appreciated that, as represented by the simplified example of the system 100 of FIG. 1, one or more users represented by the user 102 may use one or more applications represented by the application 104 both to provide personal information (represented by the provided personal information 103 in FIG. 1), and/or to manage password related information 105. For example, in a simplified example, the user 102 may represent a single user who utilizes a web browser as the application 104 for the dual purpose of maintaining password related information 105 related to a social networking website, while also publishing provided personal information 103 to the same social networking website. As just referenced, however, it also may occur that the application 104 includes, or is associated with, multiple applications. Consequently, it may occur, for example, that the user 102 provides the password related information 105 with respect to a locally-running application, or with respect to a first website, while publishing the provided personal information 103 using a second website. Similarly, and as also just referenced above, user 102 may represent two or more users utilizing one or more applications represented by the application 104. For example, a first user may publish the provided personal information 103 to a computer network such as the internet, while a second user manages the password related information 105 with respect to the same or different website. In these and other examples in which the application represents or includes a browser, it may be appreciated that some or all of the functionality of the system 100 may be implemented using a corresponding plug-in. Many other examples of such variations and implementations of the system 100 of FIG. 1 are provided in detail herein, or would be apparent to one of skill in the art.

In the example of FIG. 1, a content inspector 106 may be included which may be in communication with the application 104, and which may be configured, among other possible functionalities, to maintain a content repository 108. Specifically, for example, the content repository 108 may be configured to store any personal information associated with the user 102 which is, or which may be, relevant to the password related information 105. For example, such personal information stored within the content repository 108 may include any personal information which is designated as having a potential likelihood of use by the user 102 in creating, maintaining, or otherwise managing one or more passwords (even if the information has not yet been used in such a manner(s)). For example, as referenced above, the user 102 may be likely to use personal information such as, e.g., a name of a family member, a birthday of the user 102 or of a family member of the user 102, or other personal or historical information associated with the user 102 which the user 102 may consider to be easy to remember due to the personal significance thereof.

In addition to the use of such personal information in creating a password, as referenced above, such personal information may be used during maintenance or other management of one or more passwords. For example, such personal information may be used to provide a hint to the user 102, so that the user 102 may be facilitated in remembering or guessing a particular password, based on the hint. In other examples, one or more question/answer pairs may be established in relation to a particular password. Such question/ answer pairs often may be referred to as "secret questions" and/or "secret answers." As with the password hint referenced above, such secret question/answer pairs may be used to assist the user in remembering or otherwise recovering a forgotten or unknown password.

For example, during provisioning of the password, a provider of the password based security services, (e.g., a provider of a website or other computing resource) may require the user 102 to concurrently provide one or more secret question/answer pairs. For example, the provider may ask a question of the user 102, and store the resulting answer in conjunction with the associated password. In other examples, the provider may require that the user 102 provide both the question and answer, or may require that the user 102 select from among a plurality of possible secret questions in order to provide corresponding answers.

In these and other contexts, as described herein, it is often the case that the user 102 will choose and/or be required to provide personal information for use in creating, maintaining, or otherwise managing one or more passwords. Thus, the content inspector 106 may independently store some or all such personal information, regardless of source, within the content repository 108. For example, the content inspector 106 may implement one or more algorithms for selecting or otherwise determining personal information to be stored within the content repository 108.

To give a few examples, the content inspector 106 may be associated with a plurality of known secret question/answer pairs, i.e., such question/answer pairs used by a plurality of known website providers. Further, the content inspector 106 may maintain a list of categories or other types of personal information, and may request that the user 102 populate such a list. For example, the content inspector 106 may have access to a list which includes such commonly used personal information as, e.g., names of family members, schools attended, names of pets, previous addresses, and other such information. The content inspector 106 may request that the user 102 populate fields associated with such information, using the specific personal information associated with the user 102 in question.

In other examples, the content inspector 106 may proactively attempt to determine such personal information from identified information sources, using one or more of a plurality of methods. For example, the content inspector 106 may perform a scan of one or more computer memories associated with the user 102, and may execute an algorithm to extract personal information. For example, the content inspector 106 may be configured to inspect information sources and select names which are within a certain distance of predetermined words, e.g., husband, wife, brother, child, or other familial or professional relationship. Similarly, the content inspector 106 may be configured to extract information based on various semantic or syntactic characteristics which have been determined to be associated with personal information. The information sources may include local files of the user 102, previously-published information (e.g., published by the user 102 or by other users), or any information source which the content inspector 106 may be configured to inspect.

In particular implementations, it may occur that, for example, the application 104 represents a web browser, and that the user 102 is in the process of uploading or otherwise publishing or providing information on the website in question. For example, as referenced above, such websites may include social networking sites. Of course, it would be appreciated that such websites represent virtually any website in which the user 102 has the authority and the ability to provide information for inclusion therein. For example, such websites may include blogs, discussion boards, comment sections associated with published articles, personal or professional websites, or any other context where the user 102 may provide such information. In such cases, the content inspector 106 may be configured to inspect the content to the published, and may extract or otherwise determine potential personal information included therein for storage within the content repository 108. In other words, the content inspector 106 may perform a similar function, using similar techniques, as just described above with respect to inspection of local computer files or other local computing resources. For example, such inspection of content to be published may occur in conjunction with submission of the content by the user 102 to the website in question. Various other techniques for populating and maintaining the content repository 108 are described herein, or would be apparent to one of skill in the art.

Somewhat similarly, a password inspector 110 may be configured to maintain and/or access a password repository 112. For example, where passwords are maintained locally to the user 102, known systems and techniques exist for storing such passwords in a secure manner. For example, administrative or other privileges or authorization levels may be required before the user 102 may directly access contents of the password repository 112. In other examples, as described in detail herein, passwords stored within the password repository 112 may be encrypted or otherwise protected (e.g., subjected to a hash function and subsequently stored as a hashed version of the password in question).

Similarly, in situations in which passwords are stored remotely, such as when a website provider provides password-based secured access to a given website, it may occur that the password repository 112 may be stored in whole or in part at a location remote from the user 102 and local to the provider of the website in question. In some cases, passwords may be administered centrally for a plurality of users, e.g., within an enterprise context.

Further, it will be appreciated that the password repository 112 may include information which is related to one or more passwords, and need not be restricted to including only the passwords themselves. For example, as may be appreciated from the above description, the password repository 112 may be configured to store one or more hints and/or secret question/answer pairs in association with one or more related passwords.

In example implementations, as is well known, it may occur that password based security is provided in conjunction with a username which is unique within a given context in which a password(s) is provided, (e.g., which may be unique with respect to a specific website). In many cases, the user 102 may be required to select such a unique username, and, as with password selection, may be prone to utilize personal information in the selection thereof.

In particular examples, such a username may be designated as a particular email address associated with the user 102. In similar examples, the user 102 may select the username to be uniquely associated with a particular password, and may also associate the email address with the username and password in this context.

Consequently, it may be appreciated that such past, present, or potential usernames and/or email addresses may be determined by the content inspector 106 and stored within the content repository 108, as a result of the various operations described above with respect to the content inspector 106. Similarly, it may be appreciated that, additionally, or alternatively, the password inspector 110 may be configured to maintain and/or access such information within the password repository 112, inasmuch as such information is related to, and used in conjunction with, corresponding passwords within the password repository 112.

For example, as is well known, in particular examples it may occur that the provider of the password based security in a particular context may require the user 102 to provide an email address in conjunction with a particular password and associated hint and/or secret question/answer pair. At a subsequent time, the user 102 may forget which password was selected. At such time, the provider of the password based security may require the user 102 to provide the appropriate answer to the corresponding secret question, at which time the provider may send the missing password, or an updated or reset password, to the user 102 at the associated email address.

Thus, at a given point in time during operations of the system 100 of FIG. 1, it may occur that the content repository 108 is populated with various types and quantity of personal information associated with the user 102, while the password repository 112 is associated as populated with passwords and related information associated with the user 102. At such a point in time, it may occur that the user 102 wishes to publish, or otherwise make available, additional content on one or more computer networks. Additionally, or alternatively, at such a point in time, or at a later time, the user 102 may wish to create or update one or more passwords (or may wish to create or update information associated with one or more passwords). At such time, as referenced above, a comparator 113 may be configured to respond to the actions of the user 102 in these regards, so as to reduce or eliminate the chance that the user 102 will provide personal information which inadvertently and unintentionally allows unauthorized users to exploit such personal information in gaining access one or more password protected computing resources used by the user 102.

In the examples described herein, the comparator 113 is described as comparing the provided personal information 103 with the password related information 105. Based on a level of risk determined to be associated with a degree of similarity between the provided personal information 103 and the password related information 105, the comparator 113 may take corresponding action to reduce or eliminate such risk. For example, as described, the comparator 113 may inform the user 102 of the elevated risk level, or may prevent the user 102 from taking a specific action which is determined to be associated with an unacceptable level of risk.

Various example scenarios are provided in which the comparator 113 may perform such functions. In this regard, it may be appreciated that information designated as "provided personal information" may be stored and/or accessed in one or more of a plurality of possible locations within, or in association with, the system 100. Similarly, in a given one of such various example scenarios, information referred to as "password related information" may similarly be stored and/or accessed in one or more of a plurality of memories within, or associated with, the system 100 of FIG. 1. Moreover, it may be appreciated in these contexts that the same or similar information may be stored or accessed in two or more different memory locations at the same time. In particular, as described, a primary function of the comparator 113 is to evaluate a risk level based on a degree of similarity between the provided personal information 103 and the password related information 105. Consequently, it will be appreciated that the same or similar information may be stored at multiple locations within or in association with the system 100 of FIG. 1, and such information may be referred to, as a matter of terminology, as either provided personal information or password related information in a given context or example.

For example, in a first example scenario, the user 102 may compose content to be uploaded to a blog or social networking website associated with the user 102. Upon completion of the composition of the content, the user 102 may attempt to submit the content for network publication on the website in question. In response to the attempted submission, the content inspector 106 may determine that one or more words or other character strings within the content to be published corresponds to provided personal information previously stored within the content repository 108. Consequently, the comparator 113 may, based on the comparison, determine that it would be undesirable or unallowable to allow the user 102 to proceed with the desired content submission in its present form. For example, as described in detail below, the user 102 may be warned of potential danger in including the provided personal information 103 within the content to be submitted. In this example, it may be appreciated that the information included within the content to be submitted corresponds to provided personal information for network publication, while information stored within the content repository 108 is considered to be password related information, in the sense that the contents of the content repository 108, by definition, are designed to include information which is, or is likely to be, used as, or associated with management of, one or more passwords.

Continuing with the same example, it may be appreciated that the comparator 113 also may compare the provided personal information 103 with contents of the password repository 112, e.g., via the password inspector 110. In this case, it may be observed that the provided personal information 103 detected by the content inspector 106 within the content submitted for network publication by the user 102 may be compared against actual password information stored within the password repository 112.

To provide a more specific instance of the latter example, it may occur that the user 102 desires to upload content for a blog entry of the user 102 which includes the name "Jane." In response to the attempted submission, as described above, the content inspector 106 may detect the name Jane within a predetermined maximum number of words from the word wife. Consequently, the content inspector 106 may determine that the word "Jane" may represent provided personal information 103, and the comparator 113 may thereafter compare the thus-detected word "Jane" against contents of the content repository 108 and/or the password repository 112. As described above, the content repository 108 may already contain the name "Jane" as being identified as a name of the wife of the user 102, and therefore may take appropriate action. Additionally, or alternatively, the comparator 113 may determine that the user 102 has previously used the word Jane in formulating a previous password, e.g., either for the blog currently being updated by the user 102, or for some other website or computing resource. In this case, the comparator 113 may detect a presence of the name "Jane" within the password repository 112, and may additionally or alternatively be configured to provide the user 102 with corresponding warning or other action for which the comparator 113 is configured to reduce or eliminate the likelihood that a security of a current or feature password which employs the name "Jane" (e.g., either directly, or indirectly as part of a hint or secret question/answer pair) will be compromised.

In another example, it may occur that the user 102 visits a website for the first time. For example, the user 102 may visit a banking or other financial website, and may wish to establish a new username and password for use in accessing sensitive financial data provided thereby. In the example, the user 102 may submit a potential password for use in this regard, and, optionally, also may submit associated hints and/or secret question/answer pairs to be utilized in conjunction with the newly created password in the manners described herein. In this context, the comparator 113, in conjunction with the password inspector 110, may detect the potential new password and associated hint and/or secret question/answer pair, and may compare the attempted submissions with contents of the content repository 108 and/or contents of the password repository 112.

For example, in a similar but inverse example to the scenario described above, the user 102 may attempt to create a password based on the term "Jane". In this case, the comparator 113 may compare the submitted term with previously stored personal information within the content repository 108 (and/or with password-related information in the password repository 112), and may determine that a level of risk in utilizing such a password is undesirable or unacceptable. Thus, in this specific example, the information submitted by the user may be considered to be password related information, while contents of the repositories 108, 112 may be considered to represent previously provided personal information for a comparison therewith.

Thus, in these and similar scenarios, some of which are described in detail below, the comparator 113 may be configured to warn the user 102, or to otherwise take appropriate reaction, when the user 102 is in danger of taking action which will compromise a security level of one or more of the current or future passwords of the user 102. In this regard, as referenced above, it may be appreciated that the examples described and illustrated with respect to the system 100 of FIG. 1 are intended to represent a subset of non-limiting example implementations, and that many additional or alternative implementations are contemplated as well.

Moreover, it will be appreciated that some of the features and functions of the system 100 are described herein in a simplified form and using terminology selected to provide concise and consistent descriptions thereof. For example, the comparator 113 is illustrated as being in communication with both the content inspector 106 and the password inspector 110. However, it may be appreciated that, in fact, comparison functions of the comparator 113 may be implemented within the individual, separate components 106, 110.

Similarly, and more generally, it may be appreciated that any component of the system 100 may be implemented using 2 or more separate components, while, conversely, it is also possible that any 2 or more components may have their functionalities consolidated for implementation by a single component. Somewhat similarly, functions described in conjunction with the particular components of the system 100 may additionally or alternatively be performed by one or more other components of the system 100. For example, as described above, either or both of the repositories 108, 112 may be considered to store or access either or both of the provided personal information 103 and/or the password related information 105, at a given point in time and at a given example scenario. Also similarly in this regard, it may be appreciated that information stored within the repositories 108, 112 may, in fact, be stored within the same or different physical memory (which may be local or remote to other components of the system 100), and, in some example implementations, the system 100 may not include one of the repositories 108, 112.

Finally in the example of FIG. 1, as illustrated, the various components of the system 100 may be executed using at least one computing device 114, which may include at least one processor 114A and a computer readable storage medium 114B. For example, as referenced above, the user 102 may use a single computing device when implementing the system 100, such as, e.g., when the user 102 creates or updates a password for the local operating system for the at least one computing device 114. In other examples, as also described, a plurality of computing devices 114 may be used, such as when the user 102 accesses a local computer that is connected to one or more remote computers by way of a computer network.

In various examples, the at least one processor 114A may thus represent one, two or more processors on one or more computing devices 114. Meanwhile, the compute readable storage medium 114B may represent one or more computer memories which may be internal or external to the at least one computing device 114. For example, the computer readable storage medium 114B may include a first memory which is used to store program code which is executable by the at least one processor 114A for implementing some or all of the system 100 of FIG. 1. Additionally, or alternatively, the computer readable storage medium 114B may include one or more memories which are configured to store the content repository 108 and/or the password repository 112.

Figure 2:
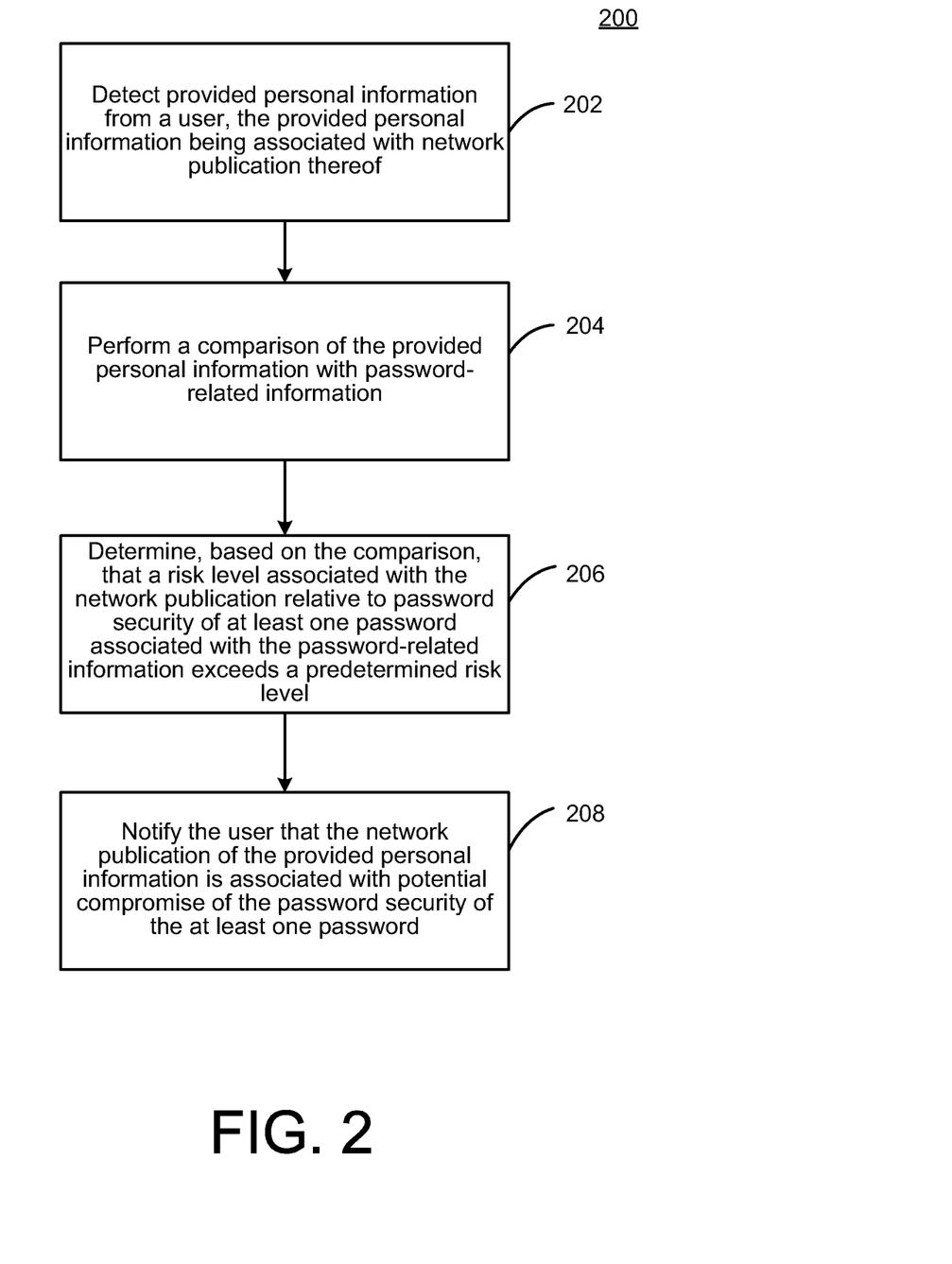
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated in a sequential order. However, it will be appreciated that the example of FIG. 2 is non-limiting, and that many additional or alternative implementations are contemplated. For example, the operations 202-208 may be executed in an overlapping or parallel manner, or may be executed in a different order than that shown. Additionally, one or more of the operations 202-208 may be modified or deleted, while additional operations not specifically illustrated in FIG. 2 may be added.

In the example of FIG. 2, provided personal information for a user may be detected, where the provided personal information is associated with network publication thereof (202). For example, the content inspector 106 may detect content provided by the user 102 which has been, or is in the process of being, or in the future may potentially be, submitted for network publication (e.g., on the internet). As described, in some implementations the content inspector 106 may determine the presence of the provided personal information 103 within the content based on a comparison of the submitted content with information stored within the content repository 108.

It will be appreciated that, in making such comparisons between the submitted content which includes the provided personal information 103 for potential network publication thereof with information within the content repository 108, the content inspector 106 may use various methodologies. For example, the content inspector 106 may perform a character by character comparison to detect exact matches between words or other character strings within the submitted content and the information within the content repository 108. In additional or alternative examples, various similarity measures may be used which do not rely on an exact match between words or other character strings to determine a relevance of the comparison.

For example, the content inspector 106 may use the Levenstheim technique for determining a level of similarity between two words or other character strings. As is known, the Levenstheim technique calculates a number of different characters present within two or more words or other character strings being compared, and assigns a degree of similarity there between based on the number determined. For example, the word "rope" may have only a one letter difference with the word "rose", but may have a two letter difference with the word "lose." It will be appreciated that such techniques are merely for the sake of example, and that many other similarity measurement techniques exist and may be used. For example, such techniques may include measures of semantic or syntactical similarity between the words or other character strings being compared, and/or may consider a context of the word being compared.

A comparison of the provided personal information may be performed with respect to password related information (204). For example, as described, the comparator 113 may compare the provided personal information 103 with the password related information stored in one or both of the repositories 108, 112. In this context, as described above, it will be appreciated that information stored within the content repository 108 may be referred to as password related information inasmuch as such information, by definition, is stored within the content repository 108 based on its past, present, or potential association with one or more passwords.

The same or similar comparison techniques, or additional techniques, may be used to execute the comparison. For example, the Levenstheim technique may be used to compare provided personal information with password-related information. In the case of hashed passwords stored in a file or other situations where security measures are taken to protect stored passwords and related information, additional or alternative techniques may be used. For example, in order to determine whether a potential publication includes password-related information, the hash of each word in a (potentially) published sentence may be calculated and compared to hashes within the hashed password file.

As described, an order of the operations 202, 204 may be modified. For example, the password related information 105 may be determined initially, in comparison thereof with provided personal information associated with potential network publication may then occur. For example, as described, the user 102 may seek to create or update a password, or associated hint or secret question/answer pair. In such cases, as described, the comparator 113 may be configured to compare the password related information associated with the creation, updating, or other management of one or more passwords, and thereafter perform a comparison thereof with provided personal information which is stored within one or both of the repositories 108, 112 (e.g., as a result of previous scanning or other operations used to detect the provided personal information). In this context, it may be appreciated that information stored within the password repository 112 may be considered to include provided personal information to be compared with the password related information 105 submitted by the user 102 in the example, in as much as the examples assume that information related to one or more passwords and associated hints and/or secret question/answer pairs may include personal information.

Based on the comparison, a risk level associated with the network publication relevant to password security of at least one password associated with the password related information may be determined to exceed a predetermined risk level (206). For example, the comparator 113 may determine that a match occurs between information which has been, or is about to be, made publicly available over a network and corresponding information stored within one or both of the repositories 108, 112. In various examples, the comparator 113 may require an exact match before taking action to one user 102 or take other appropriate measures. In other examples, however, it may occur that an exact match is not required, and that a degree of similarity is determined between the information within the repositories 108, 112 and the information to be published.

The user may be notified that the network publication of the provided personal information is associated with potential compromise of the password security of the at least one password (208). For example, the comparator 113 may be configured to issue a warning for the user 102, so as, e.g., warn the user against either network publication of the provided personal information, or to warn the user 102 against a proposed creation or update of one or more passwords or associated hints or secret question/answer pairs.

As just referenced above, the comparator 113 may determine relative levels of similarity between the provided personal information and the password related information. In such cases, resulting notifications to the user may reflect such variations in the similarity levels, and thus in the associated risk levels. For example, an exact match may be associated with a high risk level and an associated high likelihood of compromise of one or more passwords, while a low degree of similarity may be associated with the lower risk and lower likelihood of compromise. Consequently, notifications to the user may correspond to the varying risk levels. For example, in situations where risk levels are high, the user 102 may be prevented from proceeding with a desired network publication, or may be prevented from selecting a desired password. In other examples, the user 102 may be required to make modifications to the proposed network publication and/or selected password. In other examples where the risk level is relatively low, the user 102 may simply be warned of the potential compromise, but otherwise allowed to proceed with a desired action. Further, in various implementations, the user 102 may provided with varying levels of specificity related to the potential compromise of security. For example, the comparator 113 may simply issue a general warning regarding the potential compromise of password security, or, in other example implementations, may provide specific information about the password in question, or other specific information about why the action of the user 102 may result in potential compromise of password security. Still further, the comparator 113 may provide optional alternatives to the user 102, such as allowing the user 102 to use personal information within a password, but only if the password as a whole matches a certain strength level, using known measures of password strength.

Figure 3A:
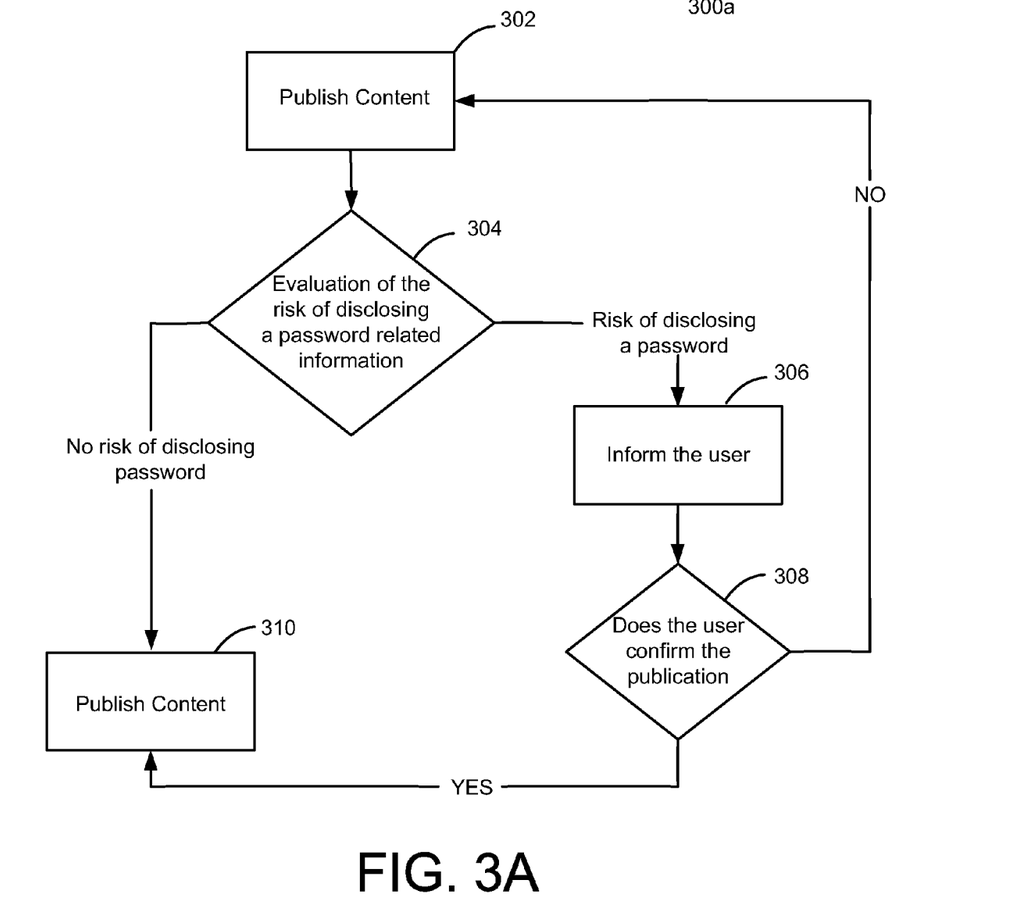
FIG. 3A is a flowchart illustrating example operations of the system of FIG. 1 during potential network publication of personal information of a user.

FIG. 3A is a flowchart 300A illustrating more detailed example implementations of the system 100 of FIG. 1. In the example of FIG. 3A, the user 102 publishes content (302). A risk of disclosing password related information is subsequently evaluated (304). If there is little or no risk associated with the content publication relevant to password related information, then the publication of the content may proceed (310). If, on the other hand, the risk of disclosing a password or password related information in conjunction with the content publication is determined to be sufficiently high, than the user 102 may be informed (306).

Consequently, the user 102 may determine whether to confirm the publication (308). If the user 102 confirms the publication, then the content may be published (310). If not, then the user 102 may decide whether to modify the content to be published, or to cease efforts to publish the content in question.

Figure 3B:
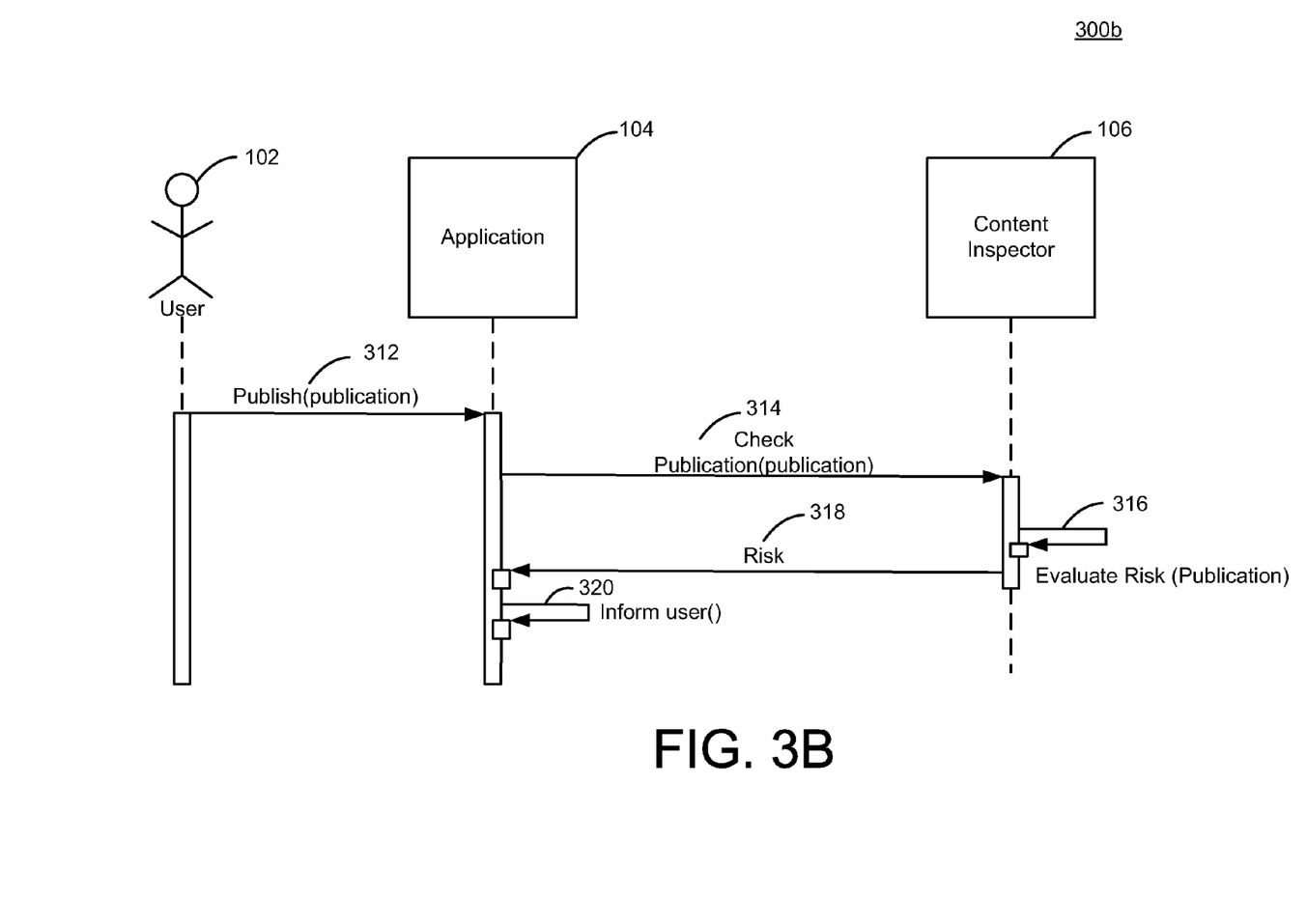
FIG. 3B is an example message pattern which may be implemented according to the operations of the flowchart of FIG. 3A.

FIG. 3B illustrates an example message flow which may occur during operations of the flowchart 300A of FIG. 3A. In the example of the example message flow 300B, the user 102 attempts to proceed with network publication (312) using the application 104. As shown by the message 314, the content inspector 106 may include or communicate with the comparator 113, and may communicate with the application 104 to obtain or otherwise inspect the content to be included within the proposed network publication. Consequently, risk evaluation (316) may proceed, so that a risk message (318) may be returned to the application 104. As just described with respect to FIG. 3A, the user 102 may thereafter be informed (320) of any potential compromise associated with one or more passwords.

Figure 4A:
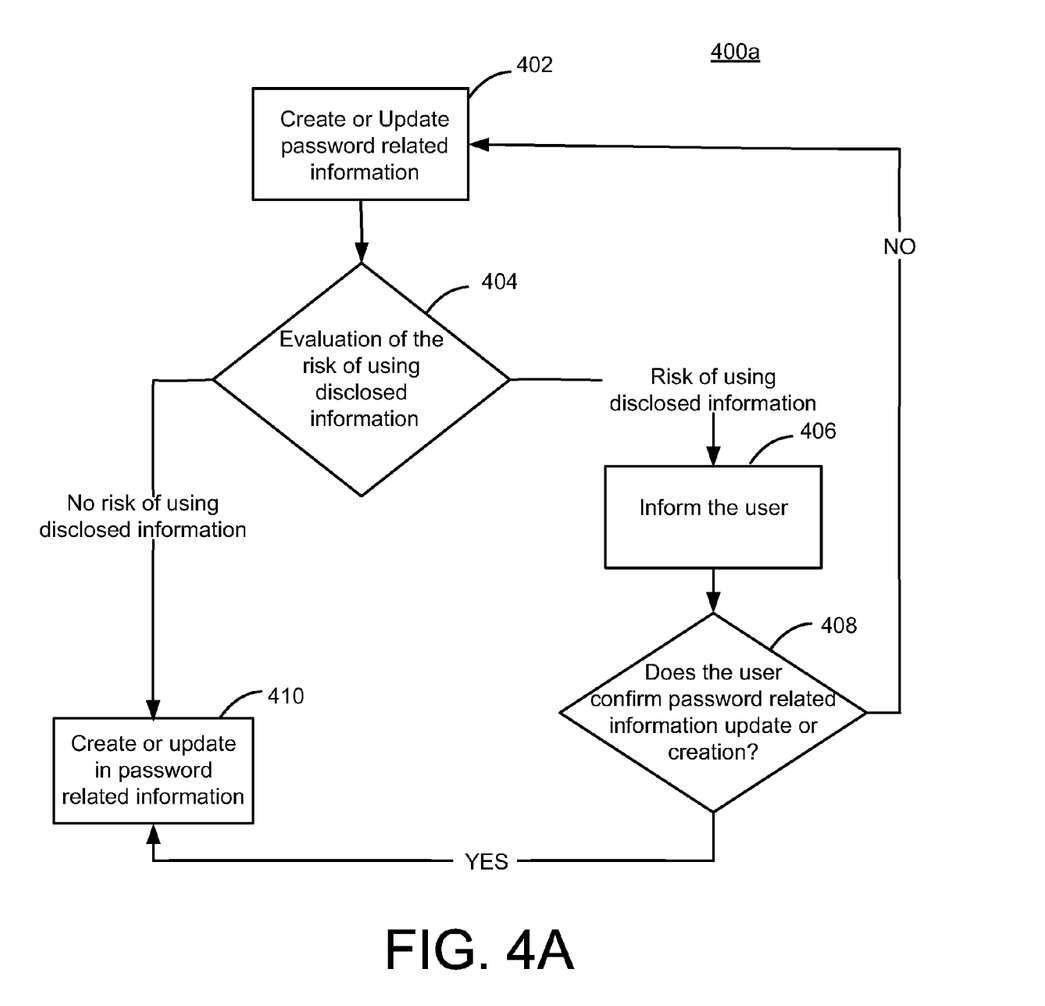
FIG. 4A is a flowchart illustrating example operations of the system of FIG. 1 during a creation or updating of password related information.

FIG. 4A illustrates a flowchart 400A showing alternative detailed examples of the operations of the system 100 of FIG. 1. In the example of FIG. 4A, the user 102 may attempt to create or update password related information (402), including, e.g., a particular password and/or associated password hint or secret question/answer pair. As in the examples above, risk evaluation of the proposed creation/update may be performed relative to provided personal information which was previously, is currently, or may potentially be, included within a network publication (404).

If little or no risk of using such provided personal information within the proposed creation/update is determined to exist, then the creation/update of the password related information may proceed (410). On the other hand, if the risk of using previously, presently, or potentially disclosed (e.g., published) information is determined to be unacceptably high, then the user may be informed (406). Consequently, if the user 102 nonetheless confirms the desired creation/update of the password related information (408), then the creation/update may proceed (410). On the other hand, if the user does not provide such confirmation (408), then the user 102 may decide to create a different password, or to update an existing password in a different manner.

Figure 4B:
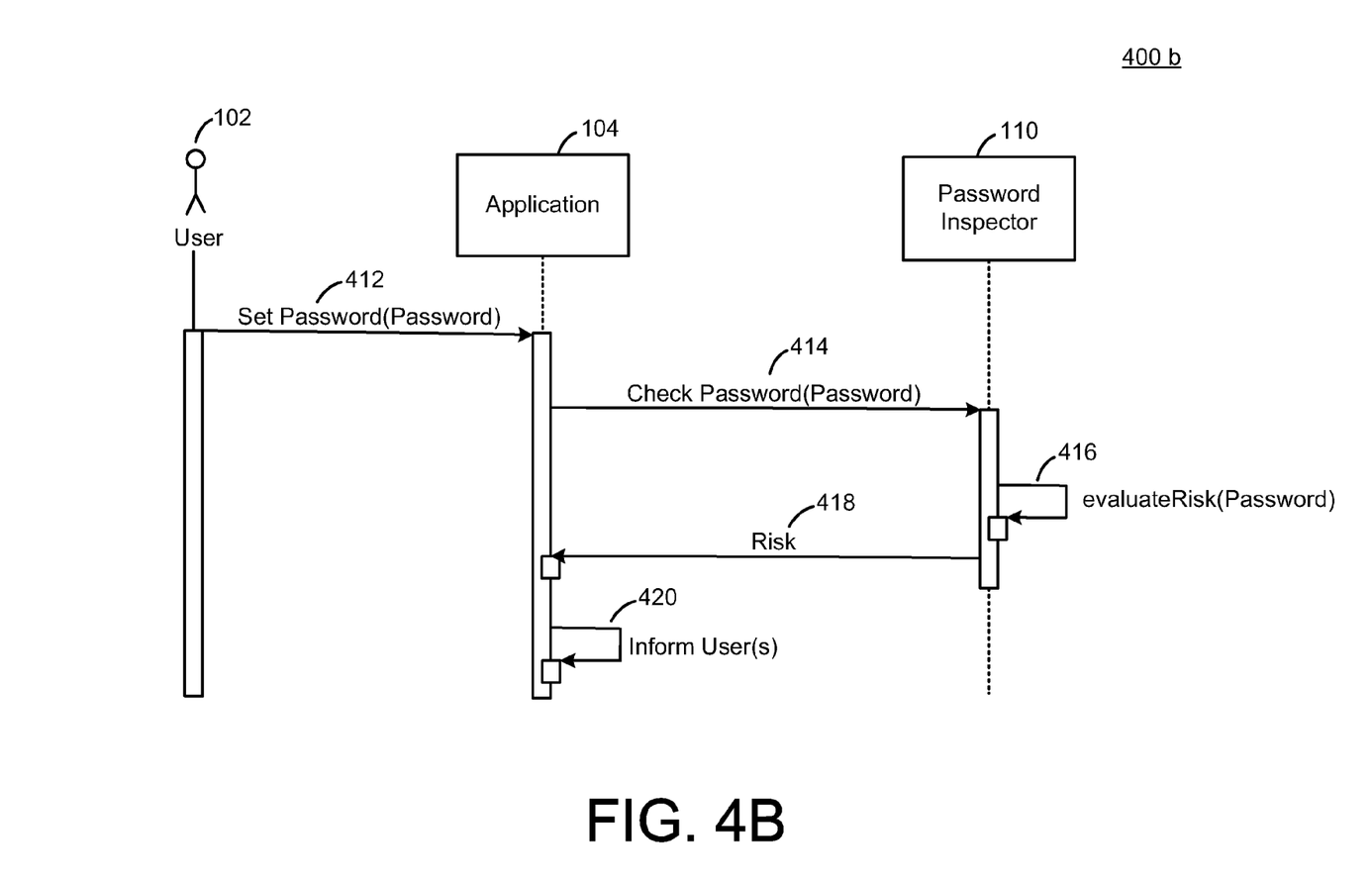
FIG. 4B is an example of a messaging flow during execution of the operations of FIG. 4A.

FIG. 4B illustrates an example messaging flow which may occur during operations of the flowchart 400A of FIG. 4A. In the example of FIG. 4B, as shown, the user 102 may submit an attempt to set a password (412), using the application 104. The application 104 may thus communicate with the password inspector 110 using an appropriate command or other message (414).

Consequently, the password inspector 110, which may include or communicate with the comparator 113, may make a determination or evaluation of the associated risk of the use of the desired password to be set relevant to a comparison thereof with provided personal information (416). The resulting risk evaluation may be included in a message (418) to the application 104, which may then.

Figure 5:
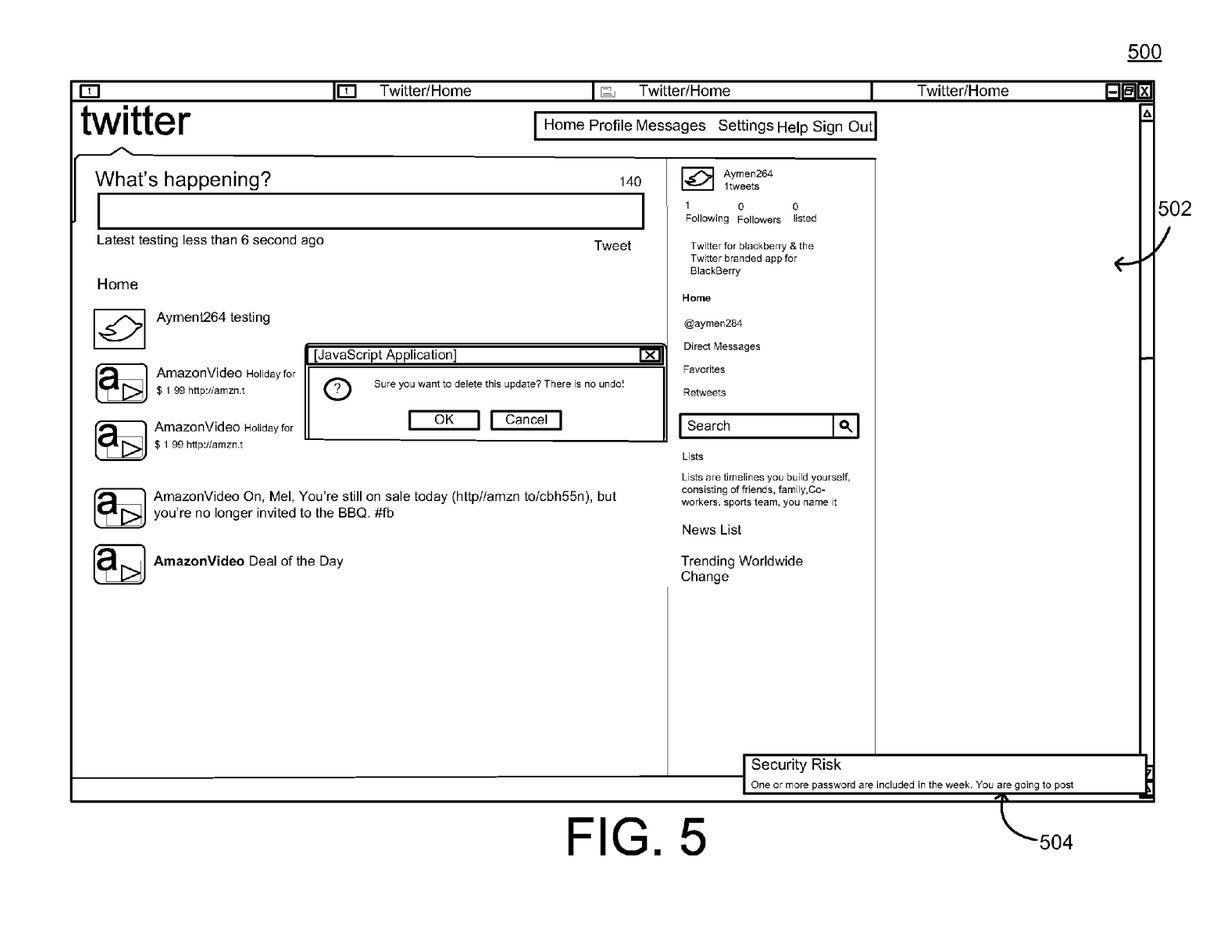
FIG. 5 is a screenshot illustrating an example operation of the system of FIG. 1 during potential publication of personal information.

FIG. 5 is a screenshot 500 illustrating example operations of the system 100 of FIG. 1. As shown in FIG. 5, a screen 502 may correspond to a website associated with a social networking account of the user 102, e.g., Twitter.com. In the example, the user 102 seeks to publish an update to the user's account which will therefore be publicly viewable to other viewers.

Consequently, a warning 504 is provided to the user which indicates that one or more passwords of the user are included in the update which the user wishes to publish. In other words, in the context of FIGS. 1-4B, FIG. 5 illustrates an example in which the user seeks to publish account which includes provided personal information, and the comparator 113 is thus configured to determine, based on an appropriate comparison, that the provided personal information within the submitted content partially or completely matches an existing password within the password repository 112. In the specific example of FIG. 5, the warning 504 includes a general statement of the security risk posed by the proposed publication of the update. In other example implementations, however, it may be possible to specifically identify one or more words within the potential update which are responsible for the user's receipt of the warning 504.

In the example of FIG. 5, it is assumed that the user 102 thereafter decides to delete the update in question, i.e., decides not to proceed with the network publication thereof. In the example, the comparator 113, perhaps acting in conjunction with the application 104 (i.e., an appropriate web browser in the example of FIG. 5), may provide the user with a pop-up box 506 which inquires as to whether the user 102 wishes to confirm deletion of the update in question. Thus, by deleting the update in question, the user 102 may be protected from inadvertently publishing information which would compromise the security of one or more of the passwords of the user 102.

Figure 6:
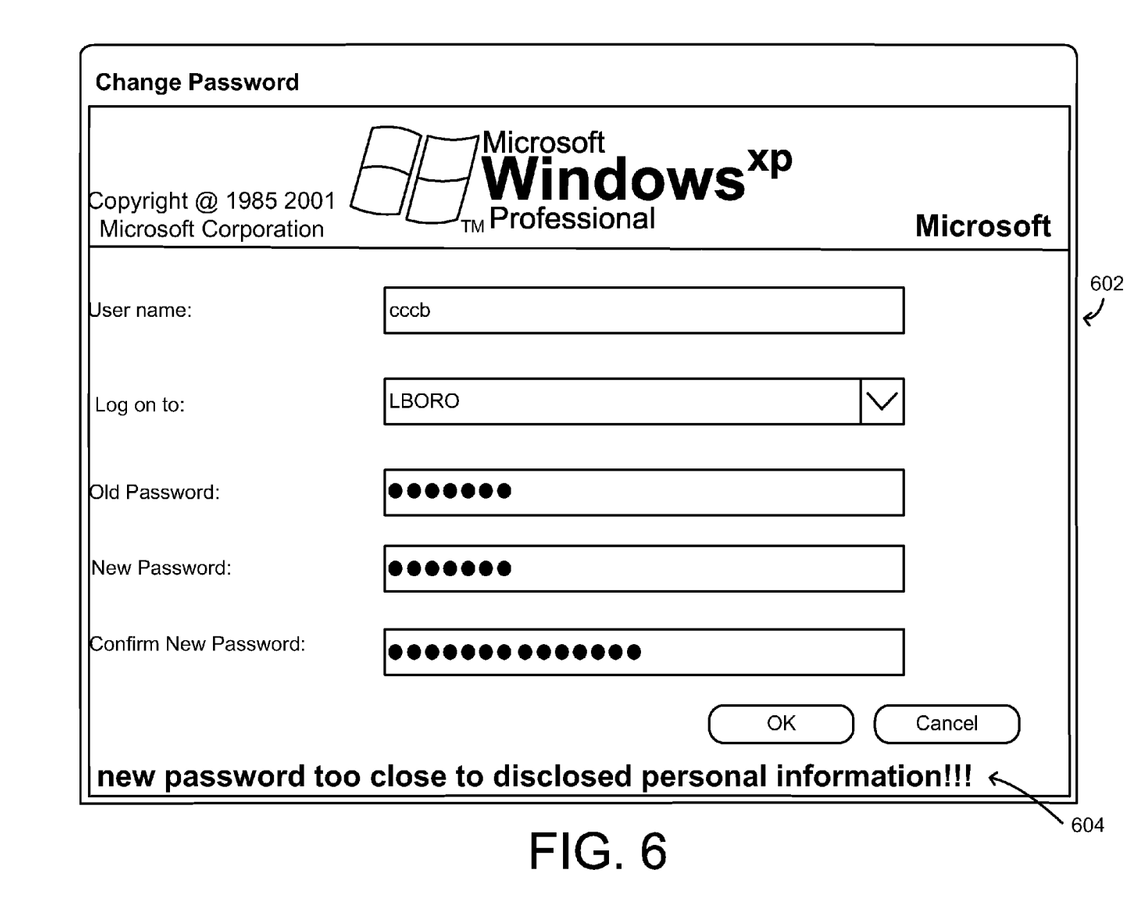
FIG. 6 is a screenshot illustrating operations of the system of FIG. 1 during a password updating process for a computer operating system.

FIG. 6 is a screenshot 600 illustrating operations of the system 100 of FIG. 1. More specifically, the screenshot 600 of FIG. 6 illustrates a specific example of the operations and associated message exchanges associated with FIGS. 4A, 4B.

In the example of FIG. 6, the user 102 wishes to update a password associated with access to an account of the user 102 maintained by the Windows XP operating system. Specifically, as shown within the box 602, the user 102 may wish to update an existing password by entering a current password in order to thereby demonstrate authorization to thereafter enter a new password for future use in accessing the account of the user 102.

As described above with respect to FIG. 1 and FIGS. 4A, 4B, the comparator 113 may be configured to detect the suggested new password, perhaps in conjunction with the password inspector 110, and to thereafter compare the proposed updated password with previously provided personal information within the repositories 108, 112.

In the example, the comparator 113 may determine that the proposed updated password matches or is sufficiently similar to information within one or both of the repositories 108, 112, and may therefore provide a warning 604 to the user 102 which indicates that the proposed password is too close to previously disclosed personal information. As in the example of FIG. 5, FIG. 6 illustrates an example in which a general warning 604 is provided to the user 102. However, in other examples, more specific warnings may be provided which are more indicative of the specific reasons for the issue of the warning 604.

Figure 7:
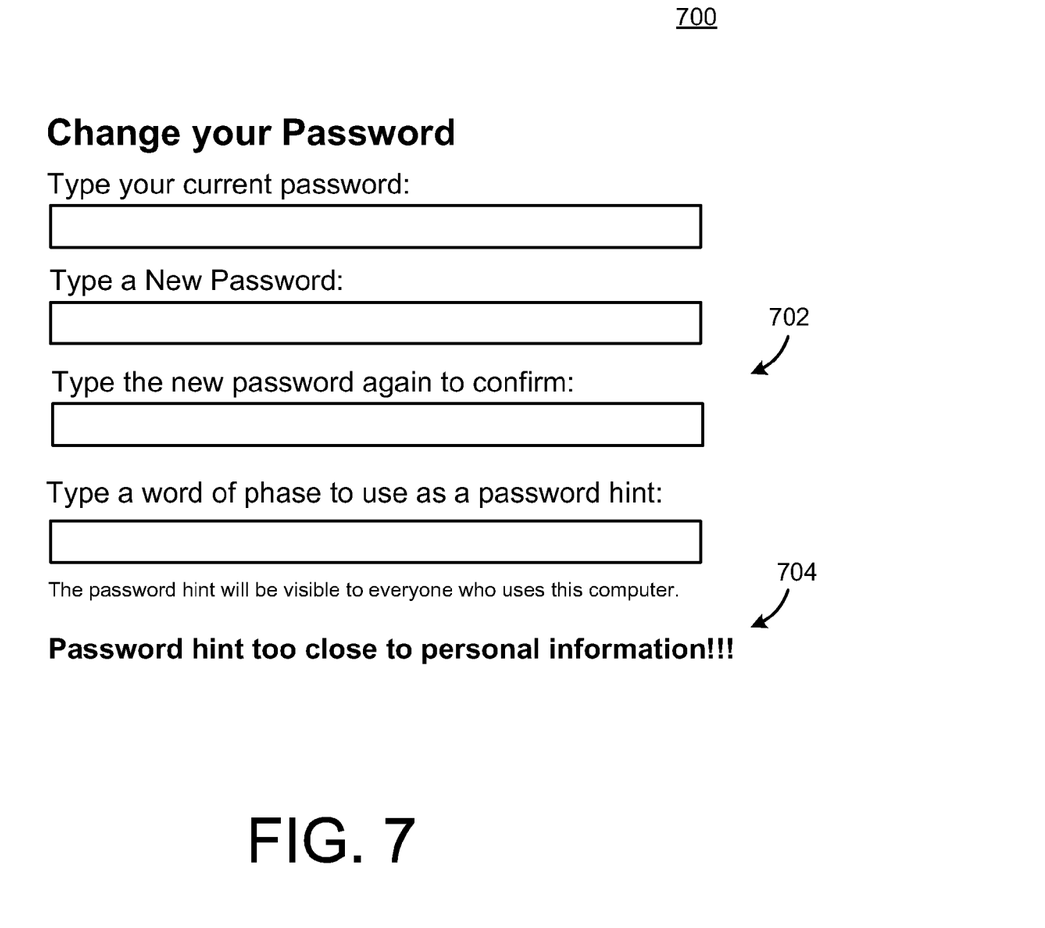
FIG. 7 is a screenshot illustrating operations of the system of FIG. 1 during selection of a password hint.

FIG. 7 is a screenshot 700 illustrating another example of operations of the system 100 of FIG. 1. In the example of FIG. 7, similarly to the example of FIG. 6, the user 102 may wish to update a current password to a new password as shown in field 702. In the example of FIG. 7, and as referenced above, the user 102 also may be required to enter a password hint, as also illustrated in the field 702.

In the example of FIG. 7, a warning 704 is issued by the comparator 113 which notifies the user 102 that the submitted password hint is too close to previously personal information, and therefore represents a potential compromise and security of the potential new password. In the example of FIG. 7, therefore, the user 102 may proceed with the desired, updated password, but may be required to change, or at least provide additional confirmation of inclusion of, the desired password hint.

Thus, the examples of FIGS. 1-7 provide examples in which one or more users are protected from inadvertently or unwisely publishing, utilizing, or otherwise providing personal information in one or more ways which may compromise any security level of any one or more passwords. Consequently, for example, such users may be less likely to suffer from unauthorized users accessing one or more of the user's accounts, or to suffer from associated difficulties which may arise in connection with such unauthorized access. Therefore, the users are better able to enjoy private and secure access to desired computing resources.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a computer-readable storage medium and executable by at least one processor of at least one computing device, the system comprising:
   a content inspector configured to cause the at least one processor to detect provided personal information from a single user and stored in a content repository, the provided personal information being associated with network publication thereof;
   a password inspector configured to cause the at least one processor to detect password related information including a plurality of passwords of the single user, each password associated with at least one computing resource, the plurality of passwords stored in a password repository; and
   a comparator configured to cause the at least one processor to perform, in response to a requested network publication of the provided personal information, a comparison of the provided personal information with the password-related information, and to determine, based on the comparison, that a risk level associated with the requested network publication relative to password security of at least one password of the plurality of passwords exceeds a predetermined risk level, and further configured to notify the user that the requested network publication of the provided personal information is associated with potential compromise of the password security of the at least one password of the plurality of passwords.

2. The system of claim 1, wherein the content inspector is configured to scan identified information sources and to execute one or more algorithms for detecting the provided personal information therein.

3. The system of claim 1, wherein the password inspector is configured to detect the password related information in conjunction with password creation or management by the user.

4. The system of claim 1, wherein the requested network publication includes uploading of the provided personal information using an application.

5. The system of claim 4, wherein the application includes a browser application.

6. The system of claim 1, wherein the password-related information includes at least one of a secret question, secret answer, password hint, or username associated with at least one of the plurality of passwords.

7. The system of claim 1, wherein the comparator is configured to determine the risk level based on a similarity analysis between the provided personal information and the password related information.

8. The system of claim 1, wherein the comparator is configured to notify the user including issuing a warning identifying the requested network publication as potentially compromising the password security of the at least one password and requesting confirmation from the user to proceed with the network publication of the provided personal information.

9. The system of claim 1, wherein the comparator is configured to notify the user including issuing a warning identifying the requested network publication as potentially compromising the password security of the at least one password and requesting confirmation from the user to proceed with an updating of the password related information.

10. The system of claim 1, wherein the comparator is configured to perform the comparison including comparing hashed versions of the provided personal information and the password related information.

11. A computer-implemented method comprising:
configuring at least one processor and/or circuit to perform the functions of
detecting provided personal information from a single user and stored in a content repository, the provided personal information being associated with network publication thereof;
detecting password related information including a plurality of passwords of the single user, each password associated with at least one computing resource, the plurality of passwords stored in a password repository;
performing a comparison of the provided personal information with the password-related information;
determining, based on the comparison, that a risk level associated with the requested network publication relative to password security of at least one password of the plurality of passwords exceeds a predetermined risk level; and
notifying the user that the requested network publication of the provided personal information is associated with potential compromise of the password security of the at least one password of the plurality of passwords.

12. The method of claim 11, wherein the password related information is detected in conjunction with password creation or management by the user.

13. The method of claim 11, wherein the risk level is based on a similarity analysis between the provided personal information and the password related information.

14. A computer program product, the computer program product being tangibly embodied on a non-transitory computer-readable storage medium and comprising instructions that, when executed, are configured to:
detect provided personal information from a single user and stored in a content repository, the provided personal information being associated with network publication thereof;
detect password related information including a plurality of passwords of the single user, each password associated with at least one computing resource, the plurality of passwords stored in a password repository;
perform a comparison of the provided personal information with the password-related information;
determine, based on the comparison, that a risk level associated with the requested network publication relative to password security of at least one password of the plurality of passwords exceeds a predetermined risk level; and
notify the user that the requested network publication of the provided personal information is associated with potential compromise of the password security of the at least one password of the plurality of passwords.

15. The computer program product of claim 14, wherein the password related information is detected in conjunction with password creation or management by the user.

16. The computer program product of claim 14, wherein the notifying of the user includes issuing a warning identifying the requested network publication as potentially compromising the password security of the at least one password and requesting confirmation from the user to proceed with the requested network publication of the provided personal information.

17. The computer program product of claim 14, wherein the notifying of the user includes issuing a warning identifying the requested network publication as potentially compromising the password security of the at least one password and requesting confirmation from the user to proceed with an updating of the password related information.

* * * * *